(12) United States Patent
Murrish et al.

(10) Patent No.: US 10,352,352 B2
(45) Date of Patent: Jul. 16, 2019

(54) MACHINING OVAL CORES IN CRANKSHAFTS

(71) Applicant: GM Global Technology Operations LLC, Detroit, MI (US)

(72) Inventors: Dale E. Murrish, Troy, MI (US); Scott A. Hucker, Ortonville, MI (US); David Hresko, Gilbert, AZ (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/726,365

(22) Filed: Oct. 5, 2017

(65) Prior Publication Data

US 2019/0107144 A1   Apr. 11, 2019

(51) Int. Cl.
*F16C 3/12* (2006.01)
*F16C 3/08* (2006.01)
*F16F 15/26* (2006.01)
*F16F 15/28* (2006.01)
*B23C 3/06* (2006.01)
(Continued)

(52) U.S. Cl.
CPC ............... *F16C 3/08* (2013.01); *F16F 15/26* (2013.01); *F16F 15/283* (2013.01); *B23B 35/00* (2013.01); *B23B 2215/20* (2013.01); *B23C 3/06* (2013.01); *B23C 2215/20* (2013.01); *B23P 15/00* (2013.01); *B23P 2700/07* (2013.01)

(58) Field of Classification Search
CPC ...... F16C 3/08; F16C 3/06; F16C 3/10; F16C 3/12; F16C 3/20; F16F 15/283; F16F 15/26; B23B 35/00; B23B 2215/20; B23P 15/00; B23P 2700/07; B23C 2215/20; B23C 3/06

See application file for complete search history.

(56) References Cited

U.S. PATENT DOCUMENTS 1,476,812 A * 12/1923 Greve .................. B21K 1/08
                                                     29/888.08
2,184,734 A * 12/1939 Chilton ................ F16F 15/145
                                                     74/574.3
(Continued)

FOREIGN PATENT DOCUMENTS

DE         1032611 B  *  6/1958  .............. F16F 15/24

OTHER PUBLICATIONS

English DE1032611 (Year: 1958).*

*Primary Examiner* — Jun S Yoo
(74) *Attorney, Agent, or Firm* — Harness, Dickey & Pierce, P.L.C.

(57) ABSTRACT

A forged crankshaft assembly for an engine, and a method of manufacturing the same, has a forged crankshaft and a removable counterweight to provide access for core drilling or milling a cavity. The forged crankshaft has a pin bearing journal, a main bearing journal, a first crank arm supporting the pin bearing journal, a second crank arm supporting the pin bearing journal and connecting the pin bearing journal and the main bearing journal, and at least one milled crank arm cavity formed within at least a portion of the second crank arm. The removable counterweight extends radially outward from the first crank arm, wherein the crank arm cavity is configured to be accessible to a core drill or mill cutter only when the removable counterweight is removed from the first crank arm and inaccessible to the core drill or mill cutter when the removable counterweight is coupled to the first crank arm.

13 Claims, 4 Drawing Sheets

(51) Int. Cl.
*B23P 15/00* (2006.01)
*B23B 35/00* (2006.01)

(56) References Cited

U.S. PATENT DOCUMENTS

| | | | | |
|---|---|---|---|---|
| 2,287,866 A * | 6/1942 | Criswell | ............... | F16F 15/283 74/571.11 |
| 2,426,874 A * | 9/1947 | Porter | ................... | F02B 75/222 74/603 |
| 2,568,576 A * | 9/1951 | Jakob | ................... | F16F 15/283 74/603 |
| 3,673,651 A * | 7/1972 | Stewart | .............. | B23K 15/0046 29/888.08 |
| 3,979,804 A * | 9/1976 | McCormick | .......... | F16B 21/183 403/34 |
| 4,356,741 A * | 11/1982 | Schopf | ...................... | F16C 3/08 29/6.01 |
| 5,408,745 A * | 4/1995 | Tomiyama | ............... | B23P 15/00 29/33 C |
| 8,813,603 B2 * | 8/2014 | Guerreiro | ................. | F16C 3/06 74/579 E |
| 2008/0092691 A1 * | 4/2008 | Wittek | ...................... | F16C 3/08 74/579 E |
| 2009/0000589 A1 * | 1/2009 | Weinzierl | ................ | F02B 75/06 123/192.2 |
| 2014/0102248 A1 * | 4/2014 | Chottiner | ................. | F16F 15/22 74/604 |
| 2015/0047461 A1 * | 2/2015 | Glanfield | ............... | F16F 15/145 74/604 |
| 2015/0285333 A1 * | 10/2015 | Brevick | ................. | F16F 15/145 123/192.2 |
| 2016/0084295 A1 | 3/2016 | Murrish et al. | | |
| 2016/0146289 A1 * | 5/2016 | Britton | ................... | F16F 15/283 74/574.2 |
| 2017/0089423 A1 | 3/2017 | Hucker et al. | | |
| 2017/0241473 A1 | 8/2017 | Murrish et al. | | |

* cited by examiner

MACHINING OVAL CORES IN CRANKSHAFTS

FIELD

The present disclosure relates to machining crankshafts and, more particularly, relates to machining oval cores within forged crankshafts.

BACKGROUND

This section provides background information related to the present disclosure which is not necessarily prior art.

An engine's crankshaft converts reciprocating linear movement of a piston into rotational movement about a crank axis to provide torque to propel a vehicle, such as but not limited to a train, a boat, a plane, or an automobile. Crankshafts are a vital part of an engine, and are a starting point of engine design. Crankshaft design affects the overall packaging of the engine, and thereby the total mass of the engine. Accordingly, minimizing the size and/or mass of the crankshaft reduces the size and mass of the engine, which has a compounding effect on the overall size, mass and fuel economy of the vehicle.

The crankshaft includes at least one crank pin journal that is offset from the crank axis, to which a reciprocating piston is attached via a connecting rod. Force applied from the piston to the crankshaft through the offset connection therebetween generates torque in the crankshaft, which rotates the crankshaft about the crank axis. The crankshaft further includes at least one main bearing journal disposed concentrically about the crank axis. The crankshaft is secured to an engine block at the main bearing journals. A bearing is disposed about the main bearing journal, between the crankshaft and the engine block.

The crankshaft is typically formed or manufactured by a casting process, such as but not limited to a green sand casting process or a shell mold casting process, which uses cast iron to form the crankshaft. Alternatively, the crankshaft may be forged from a steel alloy. Steel is stronger than cast iron, and therefore is a more desirable material to use for crankshafts. However, the forging process is more costly than the casting process. Moreover, as indicated herein, it is often desirable to minimize the size and/or mass of the crankshaft to reduce the size and mass of the engine and the associated size and mass of the vehicle, and improve its fuel economy.

It is known that in order to reduce the weight of the crankshaft, the crank pins and main bearing journals may have hollow portions. The maximum volume of the hollow portions, and thus the weight reduction of the crankshaft, is limited by the stresses that must be borne by the crankshaft during engine operation. Stated differently, the crankshaft must have a sufficient thickness in order for the crankshaft to bear the stresses. In traditionally-casted crankshafts, such hollow portions are formed using one or more internal cores. However, when forging a crankshaft, to attain benefits only available via forging, it can be difficult to remove such hollow portions due to the need to machine the forged crankshaft.

SUMMARY

This section provides a general summary of the disclosure, and is not a comprehensive disclosure of its full scope or all of its features.

According to the principles of the present teachings, a forged crankshaft assembly for an engine and a method of manufacturing the same is provided. The forged crankshaft assembly includes a forged crankshaft and a removable counterweight to provide access for core drilling or milling a cavity within the crankshaft. The forged crankshaft includes a pin bearing journal, a main bearing journal, a first crank arm supporting the pin bearing journal, a second crank arm supporting the pin bearing journal and connecting the pin bearing journal and the main bearing journal, and at least one milled crank arm cavity formed within at least a portion of the second crank arm. The removable counterweight extends radially outward from the first crank arm, wherein the crank arm cavity is configured to be accessible to a core drill or mill cutter only when the removable counterweight is removed from the first crank arm and inaccessible to the core drill or mill cutter when the removable counterweight is coupled to the first crank arm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
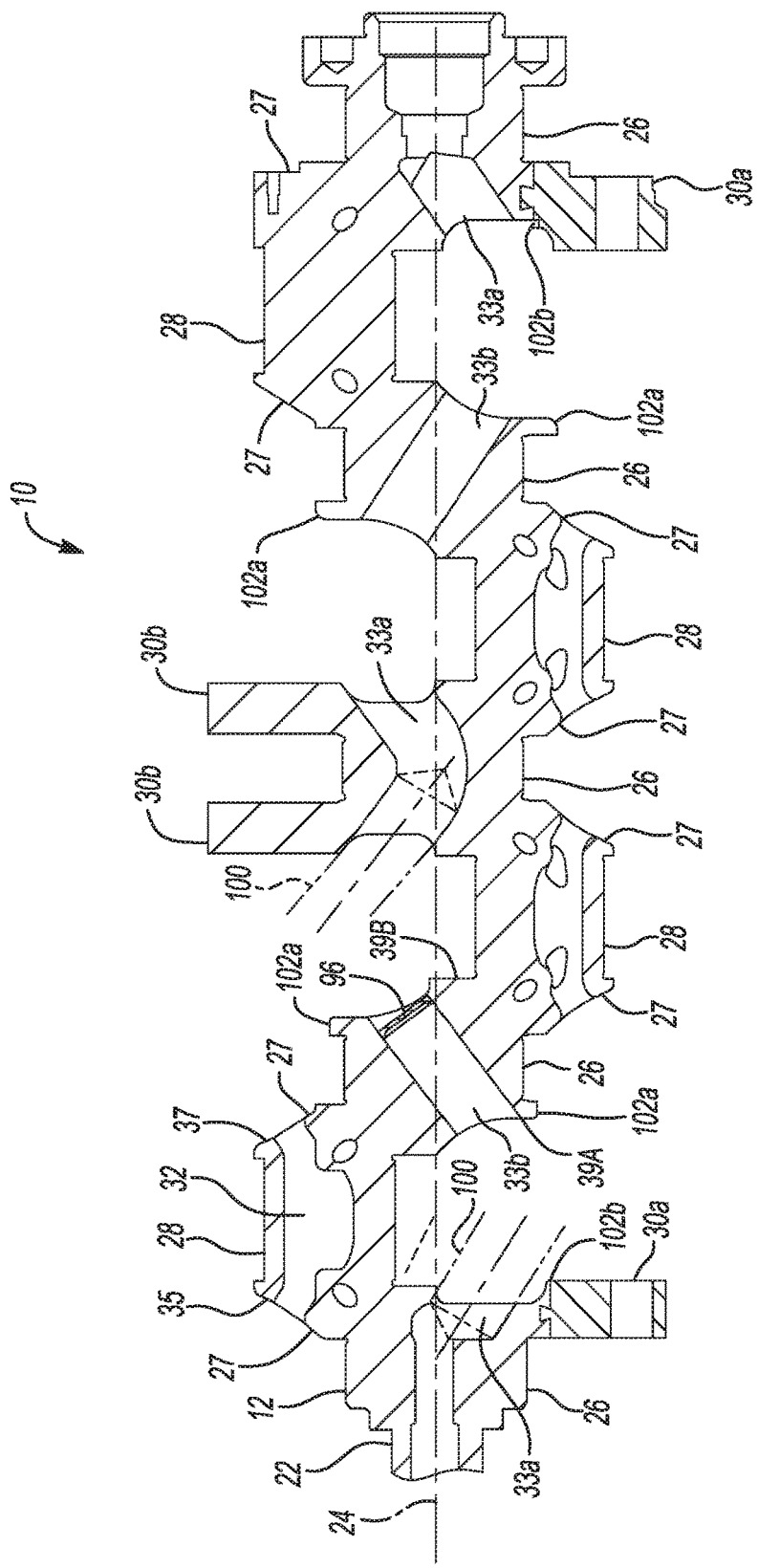
FIG. 1 is a cross-sectional view illustrating a forged crankshaft having removable counterweights and milled cavities in accordance with the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a forged crankshaft assembly 10 according to the principles of the present teachings is provided having advantageous construction and method of manufacturing same. With particular reference to FIGS. 1-8, a crankshaft assembly 10 is illustrated having a forged crankshaft 12. The crankshaft assembly 10 may be configured for an engine, such as but not limited to a gasoline engine or a diesel engine, a compressor, or some other similar device. The crankshaft 12 includes a shaft 22 extending along a longitudinal axis 24 that defines a plurality of main bearing journals 26, a plurality of crank arms 27, a plurality of pin bearing journals 28, and at least one counterweight 30.

The main bearing journals 26 are disposed concentrically about the longitudinal axis 24. Each of the pin bearing journals 28 is laterally offset from the longitudinal axis 24, and is attached, directly or indirectly, to the main bearing journals 26 by one or more crank arms 27. Each of the crank arms 27 extends from one of the main bearing journals 26 to one of the pin bearing journals 28 or between adjacent pin bearing journals 28, and may or may not include one of the counterweights 30. It should be understood that in some embodiments crank arms 27 can extend between adjacent pin bearing journals 28; therefore, crank arms 27 should not be regarded as being limited to extending only between pin bearing journals and main bearing journals. Each of the counterweights 30 extends radially away from the longitudinal axis 24. Each of the main bearing journals 26 supports a bearing (not shown) thereabout, and provides an attachment location for attaching the crankshaft 12 to an engine block (not shown). Each of the pin bearing journals 28 supports a bearing (not shown) thereabout, to which a connecting rod (not shown) is attached. The connecting rod attaches a piston (not shown) to the crankshaft 12. The counterweights 30 offset the reciprocating mass of the pistons, piston rings, piston pins and retaining clips, the small ends of the connecting rods, the rotating mass of the connecting rod large ends and bearings, and the rotating mass of the crankshaft itself (the pin bearing journals 28 and the crank arms 27). The main bearing journals 26 are on the longitudinal axis 24 and do not require any counterweights. The counterweights 30 reduce the forces acting on the main bearing journals 26 and thereby improve the durability of the bearings. The counterweights 30 balance the rotation of the crankshaft 12 about the longitudinal axis 24 to reduce vibration therein.

The embodiment of the crankshaft 12 shown in FIG. 1 is for an inline four cylinder engine, and includes four pin bearing journals 28, eight crank arms 27, five main bearing journals 26, and four counterweights 30. However, it should be appreciated that the crankshaft 12 may be configured differently than shown in FIG. 1. As such, the crankshaft 12 may be configured for any style and/or configuration of engine, including but not limited to a V style engine (e.g., an engine having two banks of cylinders arranged in a V to form a valley therebetween) having six or eight cylinders, or an inline style of engine having 3, 5, 6 or some other number of cylinders. The crankshaft may be a shared-pin V crankshaft, which has two rods per pin bearing journal such as a V8 or V12 engine. The crankshaft may be a V crankshaft with a "flying crank arm" in between the two rod journals. V6 engines have four main bearings and two rods between each main bearing. A 60 degree (bank angle between cylinders) V6 crankshaft has a thick flying crank arm between crankpins since there is a 60 degree pin splay, and a 90 degree V6 crank has a thinner flying crank arm (only a 30 degree pin splay in the end view). Furthermore, since the crank arms 27 are structural parts of the crankshaft 12 and the counterweights 30 are there to reduce forces and vibrations, the crankshaft 12 may have any number of counterweights 30 attached to the various crank arms 27 in any configuration. For example, an in-line four cylinder crankshaft may include six or eight counterweights. Accordingly, the specific crankshaft 12 shown in FIG. 1 and other crankshafts shown and described herein are merely exemplary, and should not be considered as limiting the scope of the claims.

At least one of the pin bearing journals 28 includes a cavity 32 (pin bearing cavity 32) extending at least partially from a first axial side 35 to a second axial side 37 of the pin bearing journal 28. At least one of the main bearing journals 26 and/or crank arms 27 may also include a cavity 33 (crank arm cavity 33 or crankshaft cavity 33) extending therethrough. Each of the cavities 32 in the pin bearing journals 28 and the cavities 33 in the main bearing journals 26/crank arms 27 extends generally along the longitudinal axis 24, as described in greater detail below, but not necessarily parallel to the longitudinal axis 24. In the embodiment shown, each cavity 32 that extends through the respective pin bearing journal 28 is formed to extend completely through the respective pin bearing journal 28, between the first axial side 35 of the respective pin bearing journal 28 and the second axial side 37 of the respective pin bearing journal 28 along the longitudinal axis 24 of the crankshaft 12. Similarly, each cavity 33 that extends through the respective main bearing journal 26/crank arms 27 is formed to extend completely through the respective main bearing journal 26/crank arm 27, between a first axial side 39A of the respective main bearing journal 26 and a second axial side 39B of the respective main bearing journal 26/crank arm 27 along the longitudinal axis 24 of the crankshaft 12. The cavities 32, 33 in the crankshaft 12 reduce the volume of metal used to form the crankshaft 12, thereby reducing the overall weight of the crankshaft 12. Furthermore, by reducing the weight of the pin bearing journals 28, which are laterally offset from the longitudinal axis 24, the mass of the counterweights 30 may also be reduced a corresponding amount, thereby further reducing the overall weight of the crankshaft 12.

Figure 3:
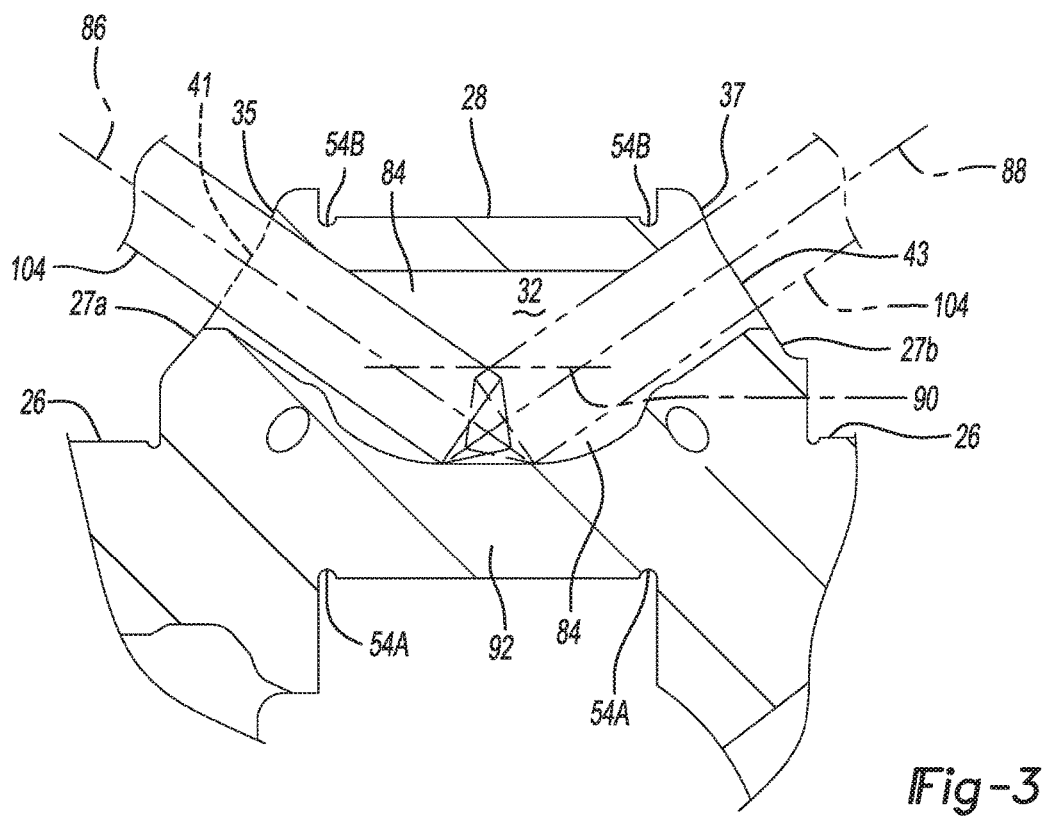
FIG. 3 is an enlarged cross-sectional view illustrating a first cavity forming step in accordance with the principles of the present teachings.
Figure 5:
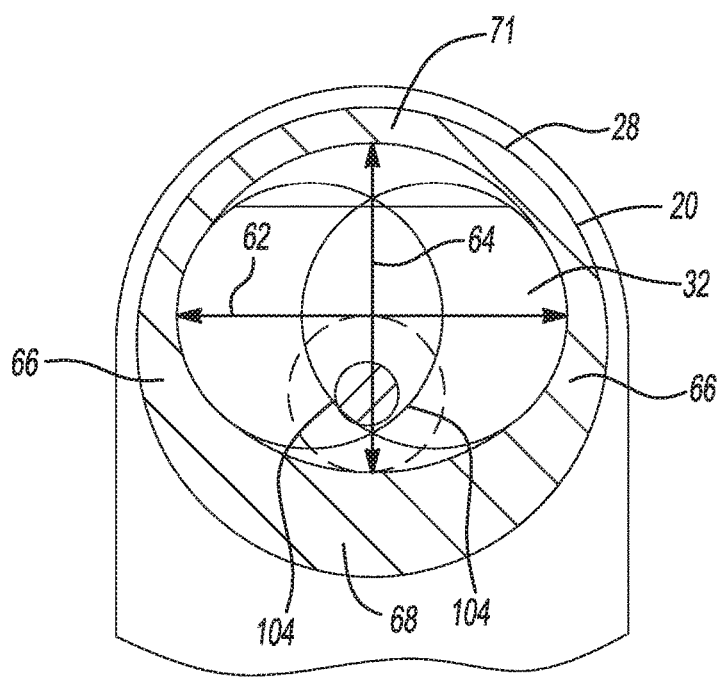
FIG. 5 is a cross-sectional view illustrating a cavity of the forged crankshaft according to FIG. 1.

In some embodiments, as illustrated in FIG. 5, the cavity 32 may define a cross-sectional shape that is a non-circular shape along a cross-section perpendicular to the longitudinal axis 24 of the crankshaft 12. For example, in the embodiment shown, the cross-sectional shape is an oval. Notably, the crankshaft 12 is generally thicker in the area adjacent to the lower fillets 54A than the area adjacent to the upper fillets 54B (FIG. 3). Stated differently, the oval of the cavity 32 is centered closer to the upper fillets 54B than the lower fillets 54A. In other embodiments, the cross-sectional shape of the cavity 32 may include but is not limited to other non-circular shapes. As shown in FIG. 5, the oval cross-sectional shape may include a horizontal major axis 62 and a vertical minor axis 64. The major axis 62 is larger than the minor axis 64. Side portions 66 of the pin bearing journal 28 outward of the cavity 32 are narrower than a lower portion 68 and an upper portion 71. Additionally, the lower portion 68 is wider than the upper portion 71. The elliptical or semi-elliptical shape of the cavity 32 maximizes the reduction in material used to form the crankshaft 12, thereby maximizing the reduction in weight of the crankshaft 12. It has been found desirable in some embodiments to have a constant wall thickness, such as 5 mm, along the upper half thereof. In some embodiments, the shape of cavity 32 could generally define a D-shape having the curvature along the upper portion and a generally flat surface along the bottom portion.

However, there is a limit to the volume of a hollow cavity in a pin bearing journal. A hollow cavity is an empty cavity filled with air or other fluid. When a pin bearing journal has a hollow cavity, the remaining material of the crankshaft must be sufficient to withstand high stresses experienced at the pin bearing journal due to loading by the connecting rods. For example, with reference to FIG. 3, the crankshaft 12 must bear stresses such that the magnitude of the stresses at the typically high stress areas at lower fillets 54A and at upper fillets 54B are not above predetermined maximum stress levels. The crankshaft 12 is configured so that the cavity 32 extends from the first axial side 35 to the second axial side 37 completely through the pin bearing journal 28 and opens at both the first axial side 35 and the second axle side 37 at openings 41 and 43, respectively.

To achieve the benefits of a reduced weight crankshaft, it is thus necessary to remove the material within cavities 32, 33. In connection with a cast crankshaft, this can be achieved via core members during the casting process. However, in the case of a forged crankshaft 12, which due to the forging process is a solid member, the process of forming cavities 32, 33 becomes more difficult. According to the principles of the present teachings, cavities 32, 33 can be formed through a milling and/or machining process. However, in order to maximize the weight reduction (i.e. minimize the weight of the forged crankshaft), it is necessary to optimize the shape of the cavities 32, 33, which generally results in non-cylindrical shapes and curves rather than straight lines required by most drilling machines. Therefore, according to the principles of the present teachings, drilling or milling of the forged crankshaft 12 can be completed using one or more unique techniques.

With particular reference to FIG. 1, it should be appreciated that milling of one or more cavities 33 may be difficult due to the particular shape of the crankshaft 12. In particular, it can be seen that a drilling or milling axis—an axis defined by a milling tool or cutter—may be limited due to interference caused by other protruding portions of the crankshaft 12. For example, in conventional crankshafts, a core drill or milling tool 100 (see FIG. 1) would likely interfere with a pinch point 102a on opposing features of crankshaft 12. As such, cavities 33a can be angled to permit sufficient standoff distance between core drill or milling tool 100 and pinch point 102a.

However, with continued reference to FIG. 1, it should be understood that in some embodiments, angling of the core drill or milling tool 100 relative to pinch point 102 may not be sufficient to provide the necessary milling operation. In such embodiments, the present disclosure provides removable counterweights 30a to facilitate milling access to cavities 33b. With the removal of removable counterweights 30a, which will be described in detail herein, core drill or milling tool 100 is provided access to cavities 33b and sufficient standoff distance between milling tool 100 and pinch point 102b. It should be appreciated that not all counterweights 30 need to be configured to be removable. That is, as illustrated in FIG. 1, counterweights 30b can remain fixed counterweights, while only removable counterweights 30a need be removed to provide sufficient access to all cavities 32, 33 to be milled. Alternatively, it should be understood that all counterweights 30 can be removable counterweights 30a to provide enhanced balancing capability, as will be described herein.

Figure 7:
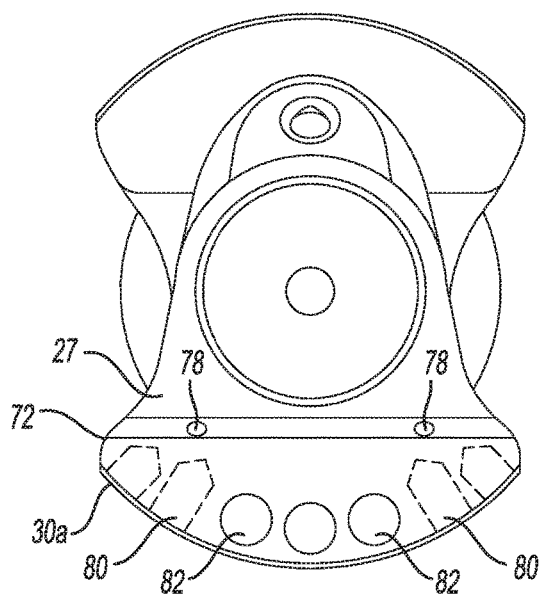
FIG. 7 is a front view illustrating a removable counterweight in accordance with the principles of the present teachings.
Figure 8:
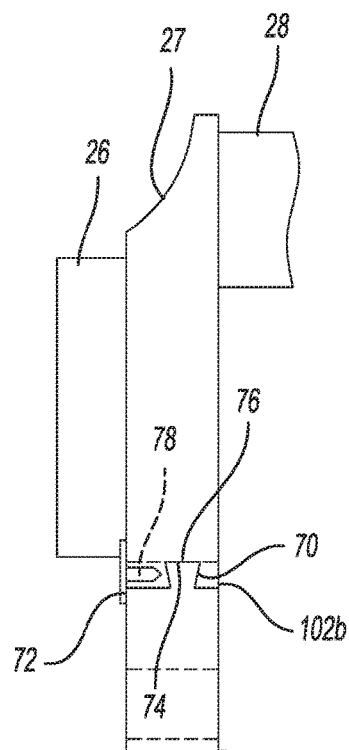
FIG. 8 is a side view illustrating the removable counterweight in accordance with the principles of the present teachings.

With particular reference to FIGS. 1, 7, and 8, in some embodiments, removable counterweights 30a are removably mounted to corresponding crank arms 27. It should be understood that removable counterweights 30a may be removably mounted according to any one of a number of methods, including but not limited to bonding, joining, coupling, threadedly coupling, welding, mechanical interface, and the like and/or any combination thereof. For example, in some embodiments, removable counterweight 30a can be removably coupled using a slot 70, such as a dovetail slot. The dovetail slot 70 can be formed along an interface 72 extending between crank arm 27 and removable counterweight 30a. Interface 72 can extend tangent to axis 24. Although the following orientation can be reversed, in some embodiments, dovetail slot 70 can comprise a dovetail shaped channel 74 extending along interface 72 of crank arm 27 and a corresponding dovetail shaped protrusion 76 extending along interface 72 of removable counterweight 30a. Channel 74 and protrusion 76 are complementarily sized and shaped to provide a sliding engagement of removable counterweight 30a with crank arm 27. In this regard, removable counterweight 30a can be removed or otherwise not installed during a milling operation of cavities 33b. Upon completion of the milling operation of cavities 33b, removable counterweight 30a can be slidably engaged with crank arm 27 via dovetail slot 70. To enhance balancing of crankshaft 12, dovetail slot 70 can be employed to permit removable counterweight 30a to be positioned at a plurality of lateral positions (when viewing FIG. 7) along dovetail slot 70. That is, removable counterweight 30a can be positioned at an offset position relative to crank arm 27 that would not otherwise be available if counterweight 30a was integrally formed with crank arm 27. Once removable counterweight 30a is joined to crank arm 27 via dovetail slot 70, removable counterweight 30a can be at least temporarily retained in position, such as for balancing, using one or more set screws 78 extending through counterweight 30a and/or crank arm 27 and engaging the other (see FIG. 8). Set screws 78 can permit balance testing and adjustment without permanent retention, if desired. Alternatively, or in addition to set screws 78, removable counterweight 30a can be spot welded, or otherwise joined, to crank arm 27 along ends of dovetail slot 70 or another convenient location. Following joining of removable counterweight 30a, further balance testing and adjustment of removable counterweights 30a, crankshaft 12, and/or crankshaft assembly 10 can be completed, such as through the removal of materials from removable counterweight 30a at bores 80 and/or the addition of materials to removable counterweight 30a at slugs 82. In this way, attachment and positioning of removable counterweight 30a to crank arm 27 can serve as an initial gross balance adjustment and modification of removable counterweight 30a via bores 80 and/or slugs 82 can serve as a final fine balance adjustment.

Figure 6:
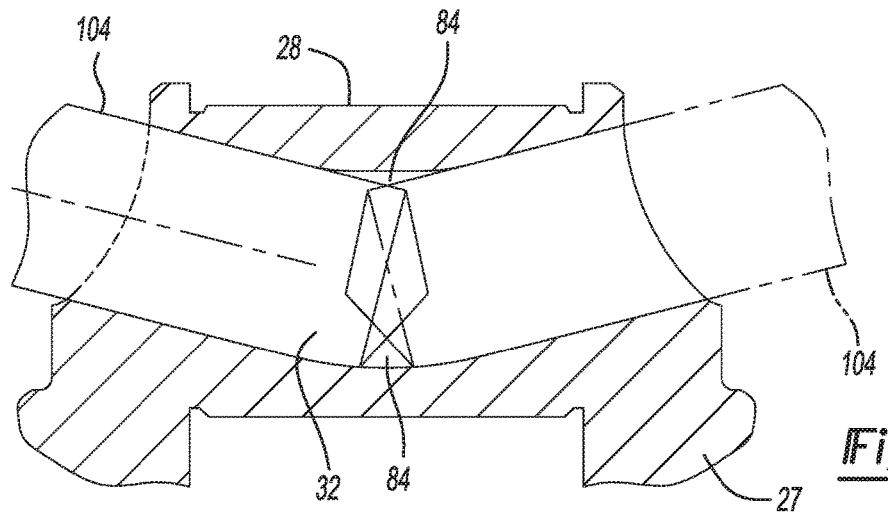
FIG. 6 is an enlarged cross-sectional view illustrating a cavity forming step in accordance with the principles of the present teachings.

With particular reference to FIGS. 1-6, cavities 32, 33 are configured to be milled in accordance with the principles of the present teachings. As indicated herein, cavities 32, 33 can define a non-cylindrical cross-section to maximize weight reduction, while ensuring that the remaining material of the crankshaft is sufficient to withstand high stresses experienced at the pin bearing journal 28 due to loading by the connecting rods. One particular non-cylindrical cross-sectional shape is illustrated in FIGS. 1-6; however, it should be understood that any cross-sectional shape determined to minimize weight while maintaining sufficient material to withstand the associated stresses is anticipated in connection with the present teachings. Machining of cavities 32, 33 can be completed in one or more steps, such as but not limited to a first step (as illustrated in FIG. 3) where a core drill 104 is used to hog out or otherwise provide a first drilling operation. Core drill 104 can be used in a single pass or multi pass. In a multi-pass process, core drill 104 can be offset to form an oval or ellipse (see FIG. 5). Core drill 104 can further be employed from opposing sides, such the first axial side 35 of the respective pin bearing journal 28 and the second axial side 37 of the respective pin bearing journal 28 (see FIG. 6). The resultant cavities 32, 33 following core drill 104 may include uncut portions 84 that can be milled using a mill cutter 106 (see FIG. 4). Mill cutter 106 can include an enlarged cutting head 108 and a reduced size spindle 110 to permit access and milling of uncut portions 84 to form a final configuration of cavities 32, 33. If necessary, crankshaft 12 can include additional removable counterweights 30a to permit access for core drill 104 and mill cutter 106 to cavities 32, 33 for cutting and/or milling operations. It should be noted, as illustrated in FIG. 6, that the principles of the present teachings, such as the drilling via core drill 104 and milling via mill cutter 106, are equally applicable to various alternative configurations and shapes of cavities 32, 33 as described herein.

Figure 4:
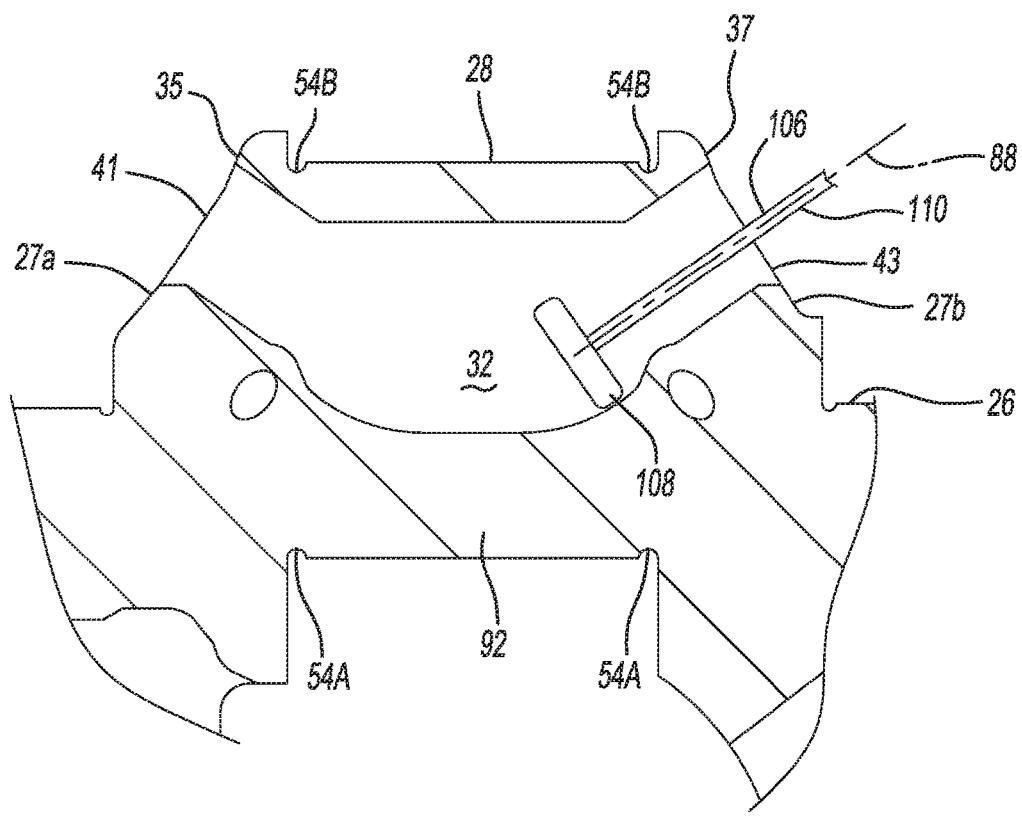
FIG. 4 is an enlarged cross-sectional view illustrating a second cavity forming step in accordance with the principles of the present teachings.

Referring to FIGS. 1, 3, and 4, in some embodiments, the cavity 32 includes a first cavity section 86, a second cavity section 88, and an enlarged central cavity section 90. The first cavity section 86 extends substantially through the first crank arm 27a. The second cavity section 88 extends substantially through the second crank arm 27b. The enlarged central cavity section 90 extends substantially through the pin bearing journal 28. The enlarged central cavity section 90 is disposed between the first cavity section 86 and the second cavity section 88, at an approximate midsection of the pin bearing journal 28. As shown in FIG. 3, the first cavity section 86 defines a first cross-sectional shape and the second cavity section 88 defines a second cross-sectional shape. In some embodiments, the first cross-section and the second cross-section of the first cavity section 86 and the second cavity section 88 each defines a substantially elliptical shape having a first cross-sectional area and a second cross-sectional area respectively. The first cross-section of the first cavity section 86 has a first cross-sectional area. Preferably, the second cross-sectional area of the second cross-section of the second cavity section 88 is substantially identical to the first cross-sectional area of the first cavity section 86. However, the second cross-section and the second cross-sectional area of the second cavity section 88 may differ from that of the first cavity section 86. The enlarged central cavity section 90 defines a third cross-section defining a third cross-sectional area. The third cross-sectional area may be larger than the first cross-sectional area and the second cross-sectional area. The third cross-sectional shape of the enlarged central cavity section 90 may be loosely described as egg shaped, i.e., a partial elliptical shape having a protrusion or oblong portion extending radially toward the crank axis 24, relative to the first cavity section 86 and the second cavity section 88. The enlarged central cavity section 90 of the cavity 32 minimizes or reduces a cross-sectional thickness 92 of the pin bearing journal 28 between a radially inner surface of the cavity 32 and a bearing surface of the pin bearing journal 28. Reducing the cross-sectional thickness 92 of the pin bearing journal 28 in this region reduces the amount of the metal alloy in this region used to form the forged crankshaft 12.

Figure 2:
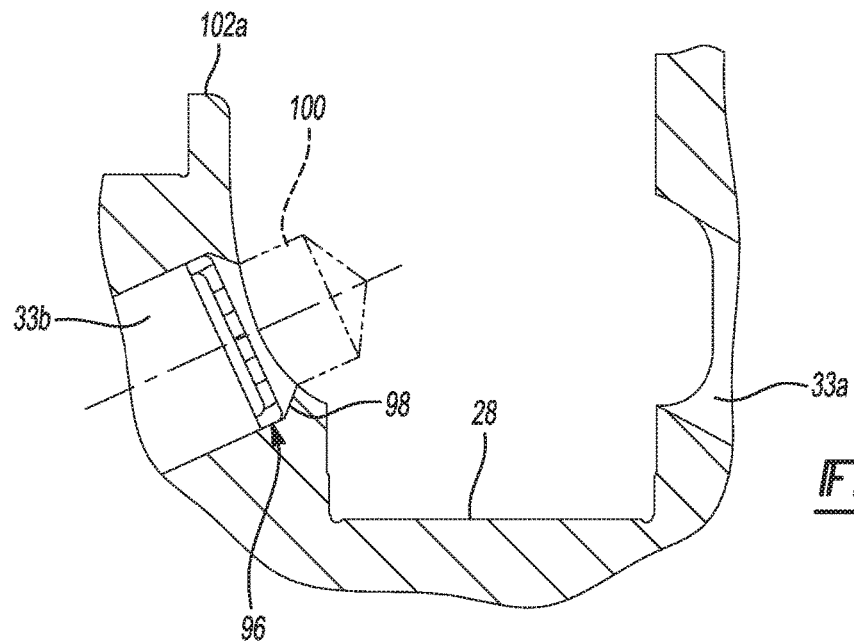
FIG. 2 is an enlarged cross-sectional view illustrating the forged crankshaft according to FIG. 1.

Following final processing of crankshaft 12, in some embodiments as illustrated in FIG. 2, it is necessary and/or desired to provide cup plugs 96 to prevent bay breathing between adjacent bays. To this end, in some embodiments, core drill 104 and/or mill cutter 106 can be configured to permit formation of a cup plug retention feature 98 such as the angled surface of a step drill formed within cavity 32, 33 (see FIG. 2).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a crankshaft assembly, the method comprising:
forging a crankshaft having an axis of rotation, a pin bearing journal parallel to and offset from the axis of rotation, a main bearing journal aligned with the axis of rotation, a first crank arm supporting the pin bearing journal, and a second crank arm supporting the pin bearing journal and connecting the pin bearing journal and the main bearing journal;
drilling or milling at least one crank arm cavity within at least a portion of the second crank arm, the at least one crank arm cavity being drilled or milled in a direction at an acute angle diagonally through the axis of rotation and being accessible for the drilling or milling only when a removable counterweight is removed; and
coupling the removable counterweight to the first crank arm after the drilling or milling of the at least one crank arm cavity to form the crankshaft assembly.

2. The method of manufacturing a crankshaft assembly according to claim 1, further comprising:
balancing the crankshaft assembly by first coupling the removable counterweight to the first crank arm and later machining the removable counterweight.

3. The method of manufacturing a crankshaft assembly according to claim 2, wherein the coupling the removable counterweight to the first crank arm comprises coupling the removable counterweight to the first crank arm using a dovetail slot extending therebetween to permit the removable counterweight to be slidably engaged with the first crank arm.

4. The method of manufacturing a crankshaft assembly according to claim 3, wherein the dovetail slot comprises a dovetail channel formed along an interface of the first crank arm and a corresponding dovetail protrusion formed along an interface of the removable counterweight.

5. The method of manufacturing a crankshaft assembly according to claim 3, further comprising engaging a fastener between the removable counterweight and the first crank arm to at least temporarily retain the removable counterweight during the balancing of the crankshaft assembly.

6. The method of manufacturing a crankshaft assembly according to claim 1, wherein the forging the crankshaft comprises forging the crankshaft having at least one integrally formed counterweight.

7. The method of manufacturing a crankshaft assembly according to claim 1, further comprising:
disposing a cup plug within the crank arm cavity to at least minimize fluid communication through the crank arm cavity.

8. The method of manufacturing a crankshaft assembly according to claim 1, further comprising:
disposing at least one stiffening plug within the crank shaft cavity to reduce stresses in the crank arm cavity or in crankshaft fillets.

9. A method of manufacturing a crankshaft assembly, the method comprising:
forging a crankshaft having a pin bearing journal, a main bearing journal, a first crank arm supporting the pin bearing journal, and a second crank arm supporting the pin bearing journal and connecting the pin bearing journal and the main bearing journal;
drilling or milling at least one crank arm cavity within at least a portion of the second crank arm, the at least one crank arm cavity being accessible for the drilling or milling only when a removable counterweight is removed;
coupling the removable counterweight to the first crank arm after the drilling or milling of the at least one crank arm cavity to form the crankshaft assembly; and
drilling or milling at least one pin bearing cavity having a first cavity section, a second cavity section, and an enlarged central cavity section, the first cavity section extending substantially through the first crank arm, the second cavity section extending substantially through the second crank arm, and the enlarged central section extending through the pin bearing journal between the first cavity section and the second cavity section, the enlarged central cavity section being sized larger than the first cavity section and the second cavity section to minimize a cross sectional thickness between a radially inner surface of the central cavity and a bearing surface of the pin bearing journal.

10. The method of manufacturing a crankshaft assembly according to claim 9, wherein the at least one pin bearing cavity is accessible for the drilling or milling only when the removable counterweight is removed.

11. The method of manufacturing a crankshaft assembly according to claim 9, wherein the first cavity section and the second cavity section each define an elliptical shape.

12. A method of manufacturing a crankshaft assembly, the method comprising:
forging a crankshaft having a pin bearing journal, a main bearing journal, a first crank arm supporting the pin bearing journal, and a second crank arm supporting the pin bearing journal and connecting the pin bearing journal and the main bearing journal;
drilling or milling at least one crank arm cavity within at least a portion of the second crank arm, the at least one crank arm cavity being accessible for the drilling or milling only when a removable counterweight is removed;
coupling the removable counterweight to the first crank arm after the drilling or milling of the at least one crank arm cavity to form the crankshaft assembly; and
wherein the drilling or milling at least one crank arm cavity comprises a first step of milling, cutting, or machining a first portion of the crank arm cavity using a core drill and a second step of milling an uncut portion of the crank arm cavity using a mill cutter.

13. The method of manufacturing a crankshaft assembly according to claim 12, wherein the first step comprises a plurality of passes of the core drill and results in formation of an oval cross-sectional shape of the crank arm cavity.

* * * * *